(12) United States Patent
Grant et al.

(10) Patent No.: US 11,689,605 B2
(45) Date of Patent: Jun. 27, 2023

(54) IN-NETWORK COMPUTE ASSISTANCE

(71) Applicant: National Technology & Engineering Solutions of Sandia, LLC, Albuquerque, NM (US)

(72) Inventors: Ryan Grant, Albuquerque, NM (US); William Whitney Schonbein, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 304 days.

(21) Appl. No.: 16/850,994

(22) Filed: Apr. 16, 2020

(65) Prior Publication Data
US 2021/0329061 A1    Oct. 21, 2021

(51) Int. Cl.
*H04L 67/10* (2022.01)
*G06F 9/50* (2006.01)

(52) U.S. Cl.
CPC ............ *H04L 67/10* (2013.01); *G06F 9/5011* (2013.01); *G06F 2209/509* (2013.01)

(58) Field of Classification Search
CPC ... H04L 67/10; G06F 9/5011; G06F 2209/509
See application file for complete search history.

(56) References Cited

U.S. PATENT DOCUMENTS

| 5,396,629 | A  | * | 3/1995 | Bonnafoux | ............. | G06F 11/20 |
| | | | | | | 714/E11.174 |
| 8,365,111 | B2 | * | 1/2013 | Chen | ....................... | G06F 30/33 |
| | | | | | | 716/108 |
| 8,688,903 | B1 | | 4/2014 | Hemmert et al. | | |
| 2010/0201573 | A1 | * | 8/2010 | Lamming | ............. | G01S 5/0289 |
| | | | | | | 342/451 |
| 2020/0175741 | A1 | * | 6/2020 | Gierach | .................... | G06T 1/20 |

OTHER PUBLICATIONS

Barrett, B.W. et al., "The Portals 4.2 Network Programming Interface", Sandia Report, SAND2018-12790, Nov. 2018, 158 pages.
Hoefler, T. et al., "sPIN: High-performance streaming Processing in the Network", In Proceedings of SC17, Association for Computing Machinery, New York, NY, USA, Article 59, 16 pages, Nov. 12-17, 2017, https://doi.org/10.1145/3126908.3126970.

(Continued)

*Primary Examiner* — Azizul Choudhury
(74) *Attorney, Agent, or Firm* — Gregory M. Doudnikoff; Yee & Associates, P.C.

(57) ABSTRACT

A method and apparatus for performing operations by network interface cards in a network of computers. A network interface card is configured to receive a message and to interpret the message to identify a primitive operation to be performed. The primitive operation is one of a plurality of primitive operations that are performed to perform an operation. The primitive operation is performed by the network interface card and a trigger signal is generated in response to performing the primitive operation. The trigger signal is interpreted to identify a triggered message. The triggered message identifies a next one of the plurality of primitive operations to be performed. The triggered message is transmitted back to the network interface card or to another network interface card in the network for processing.

15 Claims, 5 Drawing Sheets

(56) References Cited

OTHER PUBLICATIONS

Petrini, F. et al., "The Quadrics Network: High-Performance Clustering Technology", IEEE Micro, vol. 22, No. 1, pp. 46-57, Jan.-Feb. 2002.

Schneider, T. et al., "Protocols for Fully Offloaded Collective Operations on Accelerated Network Adapters", 2013 42nd International Conference on Parallel Processing, Lyon, 2013, pp. 593-602.

* cited by examiner

IN-NETWORK COMPUTE ASSISTANCE

GOVERNMENT LICENSE RIGHTS

This invention was made with Government support under Contract No. DE-NA0003525 awarded by the United States Department of Energy/National Nuclear Security Administration. The U.S. Government has certain rights in the invention.

BACKGROUND INFORMATION

1. Field

The present disclosure relates generally to computer processing and to systems and methods for performing operations by network interface cards in a network of computers. More particularly, illustrative embodiments are directed to a system and method for providing general purpose compute capabilities on a network interface card and the network so that a computer can offload computational work onto the network.

2. Background

A network interface card, NIC, is a computer hardware component that connects a computer to a computer network. A network interface card also may be known as a network interface controller, a network adapter, a physical network interface, and by other similar terms. Network interface cards were commonly implemented on expansion cards that plugged into a computer bus. Most newer computers have a network interface built into the motherboard of the host computer.

Network interface cards may provide wired or wireless network communications. Network interface cards may provide communications between computers connected via a local area network, LAN, as well as communications over a large-scale network through Internet Protocol, IP.

Modern network interface cards may offer various advanced features. Such advanced features may include interrupt and direct memory access, DMA, interfaces to a host processor, support for multiple receive and transmit queues, partitioning into multiple logical interfaces, and network traffic processing.

Offload or in-network processing by network interface cards may be used to reduce involvement by a host processor in packet processing and to mask packet processing overheads by overlapping them with other computations by the host processor. Such offload processing by network interface cards has been used for higher-level stream processing and to offload processing for lower-level network protocols.

The performance impacts of offloading collective operations, generalizability, and offloading at the network interface card and network switch have been explored. The use of offload capacities of network interface cards for purposes other than originally intended, such as using a hardware matching engine to offload key-value store processing, has been proposed.

However, current systems and methods do not take full advantage of the possibility of exploiting existing offload features of network interface cards for novel ends. In particular, current systems and methods do not take advantage of network interface cards to provide general-purpose compute capacities.

Therefore, it may be desirable to have a method and apparatus that take into account at least some of the issues discussed above, as well as other possible issues.

SUMMARY

Illustrative embodiments provide a method of performing an operation. A message is received. The message is interpreted to identify a primitive operation to be performed. The primitive operation is one of a plurality of primitive operations that are performed to perform the operation. The primitive operation is performed. A trigger signal is generated in response to performing the primitive operation. The trigger signal is interpreted to identify a triggered message. The triggered message identifies a next one of the plurality of primitive operations to be performed. The triggered message is then transmitted.

Other illustrative embodiments also provide a method of performing an operation. A message comprising a message tag is received. The message tag is used to identify an entry in a match table. The entry in the match table identifies a primitive operation to be performed. The primitive operation is one of a plurality of primitive operations that are performed to perform the operation. The primitive operation is performed. A value of a counter is changed in response to performing the primitive operation. The value of the counter is used to identify a triggered message. The triggered message comprises a triggered message tag identifying a next one of the plurality of primitive operations to be performed. The triggered message is then transmitted.

Illustrative embodiments also provide an apparatus for performing an operation comprising a receiver, a matching unit, a primitive operations unit, a triggered operations unit, and a transmitter. The receiver is configured to receive a message. The matching unit is configured to interpret the message to identify a primitive operation to be performed. The primitive operation is one of a plurality of primitive operations that are performed to perform the operation. The primitive operations unit is configured to perform the primitive operation. The triggered operations unit is configured to identify a triggered message in response to performing the primitive operation. The triggered message identifies a next one of the plurality of primitive operations to be performed. The transmitter is configured to transmit the triggered message.

The features and functions may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Illustrative embodiments recognize and take into account various considerations. For example, the illustrative embodiments recognize and take into account that, as network speeds have increase to hundreds of gigabits per second and beyond, message processing overheads have become increasingly onerous. Manufacturers now provide network interface cards with offload processing capabilities. These capabilities may include direct memory access, hardware for performing message matching based on rank and tag addressing, performing atomic operations, and support for issuing new messages independently of a host application. Examples of atomic operations that may be performed by network interface cards include, without limitation, adding two numbers together and comparing and swapping two numbers. Independently issuing new messages by a network interface card may be referred to as triggered operations. These capabilities may operate independently of the host processor, thereby significantly reducing latencies associated with communications by admitting parallelism in the form of communication-computation overlap.

Illustrative embodiments also recognize and take into account that current proposals for in-network data processing operate on data as it streams through a network switch or endpoint. Stream-based approaches that leverage general-purpose compute cores and instruction level parallelism in combination with network offloading have been proposed. For example, in one proposed stream processing in-network approach, users write and load routines onto the network interface card. Messages incoming to the network interface card are inspected. When payload processing is required, each subsequent packet is directed to a compute core of the network interface card where it is processed by a packet processing routine. The results are written to memory via direct memory access.

By working on data where it resides, rather than moving it to the host processor for processing, such stream processing approaches may achieve speedups for many use cases. However, computation complexity is fundamentally limited for such stream-based processing approaches. The compute resources of a network interface card must be available when data arrives, so that normal network communications functions may be performed without undesirable delays. This imposes a deadline on the amount of time that the compute core of the network interface card has to perform other processes on the data as it passes through. Therefore, the number of instructions that may be executed by the network interface card processor to perform such processes is limited. This instruction limit may be increased by adding processing cores to the network interface card, introducing additional message processing latency through buffering, or increasing packet size, for example, but doing so does not remove the deadline.

Illustrative embodiments provide deadline-free general purpose compute assistance by network endpoints. Illustrative embodiments build upon current network interface card offload capabilities to provide deadline-free, general-purpose compute capacities on network interface cards. In-network compute assistance in accordance with an illustrative embodiment can be utilized even when the network is inactive. Illustrative embodiments may be implemented by extending existing network interface card hardware. Illustrative embodiments may be used to reduce the runtime of various applications with minimal code modifications.

Illustrative embodiments leverage message matching, atomic operations, and triggered operation capabilities of network interface cards to provide general-purpose data processing. In contrast to stream-based approaches to data processing on network interface cards, illustrative embodiments are deadline-free and preemptible and can process data even when the network is idle. In accordance with an illustrative embodiment, network interface cards may be viewed somewhat analogously to co-processors in the model of compute assistance that is provided to host processors. Illustrative embodiments provide opportunities for significant data parallelism that can more than make up for lost serial computational speed.

Illustrative embodiments provide an architecture for a network interface card that is capable of providing general-purpose data processing computations as described herein. Illustrative embodiments may be implemented with relatively minor changes to existing network interface card architectures. Illustrative embodiments also may include various architectural enhancements to further significantly reduce application runtimes.

Figure 1:
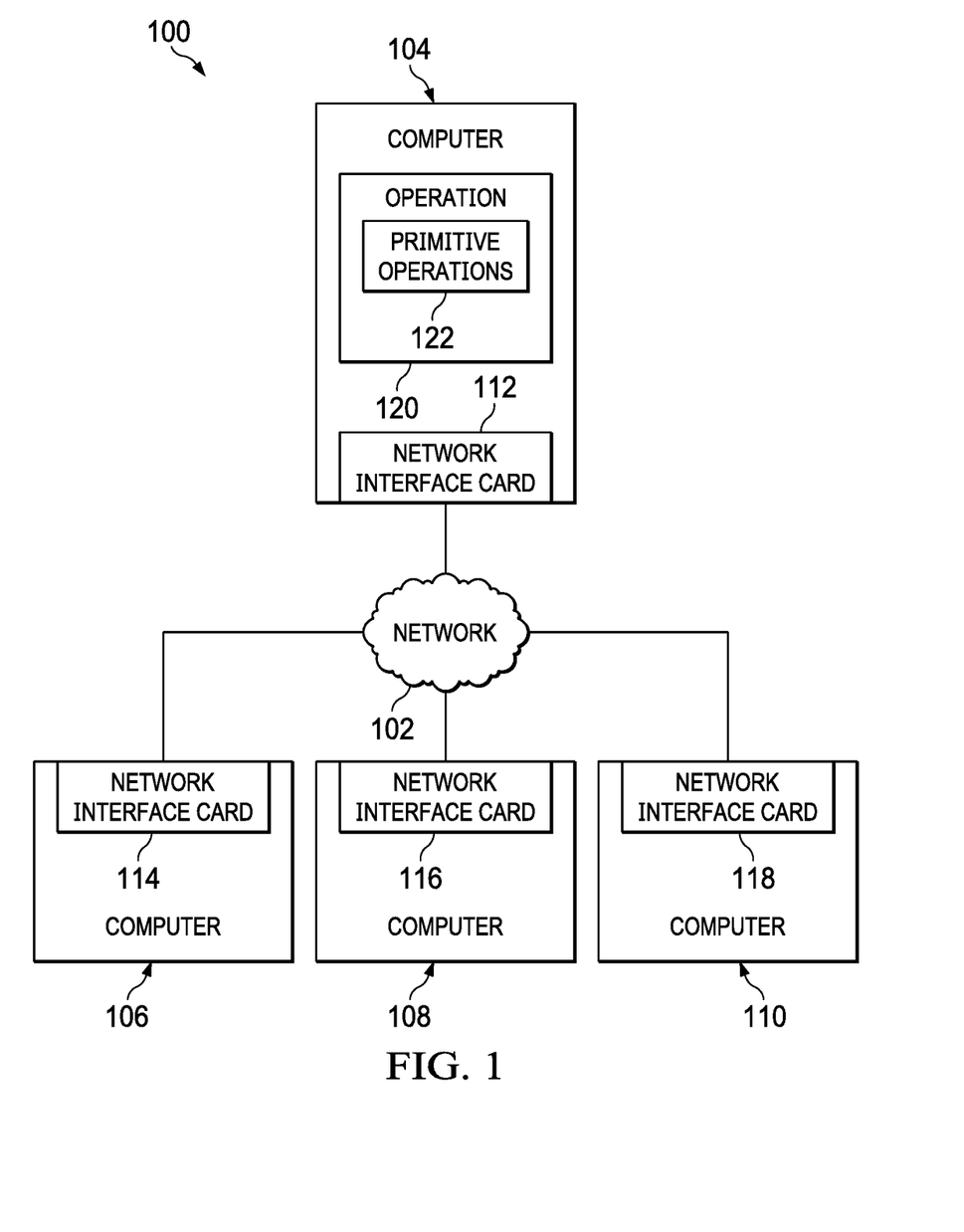
FIG. 1 is a pictorial representation of a network data processing system in accordance with an illustrative embodiment.

With reference now to the figures and, in particular, with reference to FIG. 1, a pictorial representation of a network data processing system is depicted in accordance with an illustrative embodiment. Illustrative embodiments may be implemented in network data processing system 100. FIG. 1 is intended as an example, and not as an architectural limitation, for the different illustrative embodiments.

Network data processing system 100 includes network 102. Network 102 is the medium used to provide communications between various devices and computers connected together within network data processing system 100. Network 102 may include various connections, such as wire, wireless communication links, or fiber optic cables.

Network data processing system 100 may be implemented using a number of different types of networks. For example, without limitation, network 102 can be comprised of at least one of the Internet, an intranet, a local area network (LAN), a metropolitan area network (MAN), a wide area network (WAN), or any other appropriate network or combination of networks.

In the depicted example, computer 104, computer 106, computer 108, and computer 110 connect to network 102. In this illustrative example, computers 104, 106, 108, and 110 are network devices that connect to network 102 in which network 102 is the communications media for these network devices. Computers 104, 106, 108, and 110 connect to network 102 utilizing at least one of wired, optical fiber, or wireless connections. A network data processing system in accordance with an illustrative embodiment may include any appropriate number of computers. For example, a network data processing system in accordance with an illustrative embodiment may include more or fewer than four computers.

Computers 104, 106, 108, and 110 connected to network 102 may include any appropriate data processing system or device. For example, without limitation, computers 104, 106, 108, and 110 may include server computers and client devices. A sever computer may provide information, such as boot files, operating system images, and applications to client devices via network 102. For example, without limitation, client devices may include client computers, workstations, or network computers. Further, client devices may also include other types of data processing devices such as mobile phones, tablet computers, and smart glasses. Some or all of the client devices in network data processing system 100 may form an Internet of things (IoT) in which these physical devices can connect to network 102 and exchange information with each other over network 102.

Computers 104, 106, 108, and 110 are connected to network 102 via network interface cards 112, 114, 116, and 118, respectively. In the present application, including in the claims, unless explicitly stated otherwise, "network interface card", and similar terms, includes devices known by the terms network interface controller, network adapter, physical network interface, and by other similar terms. The illustrative embodiments are not limited to network interface cards that are implemented as cards that plug into a computer bus.

Computers 104, 106, 108, and 110 may perform various operations. For example, computer 104 may perform operation 120. Operation 120 may include any appropriate operation. For example, without limitation, operation 120 may be a mathematical operation, a logical operation, or any other appropriate type of operation or combination of various different types of operations. Operation 120 may be referred to as a complex operation.

Illustrative embodiments recognize that operations performed by computers 104, 106, 108, and 110 on network 102, such as operation 120, for example, may be performed by performing a plurality of appropriate primitive operations 122. In the present application, including in the claims, unless explicitly stated otherwise, "primitive operations" includes any plurality of operations that may be performed to perform another operation. For example, without limitation, primitive operations 122 may include atomic operations, operations that can be completed in one step, or other appropriate operations.

In accordance with an illustrative embodiment, network interface cards 112, 114, 116, and 118 provide general-purpose compute assistance to computers 104, 106, 108, and 110 connected to network 102 to perform various operations. For example, in accordance with an illustrative embodiment, operation 120 may be performed for computer 104 by performing primitive operations 122 by one or more of network interface cards 112, 114, 116, and 118.

In accordance with an illustrative embodiment, one or more of network interface cards 112, 114, 116, and 118 may be configured to perform operation 120 by performing primitive operations 122 using network interface card capabilities for message matching, atomic operations, and triggered issuing of new messages independently of a host application. For example, one of network interface cards 112, 114, 116, and 118 may be configured to perform a first one of primitive operations 122 in response to receiving a message from computer 104. The network interface card performing the first one of primitive operations 122 independently transmits a message to one of network interface cards 112, 114, 116, and 118 to cause the next one of primitive operations 122 to be performed. This process is repeated until all of primitive operations 122 are performed by network interface cards 112, 114, 116, and 118 to perform operation 120.

Figure 2:
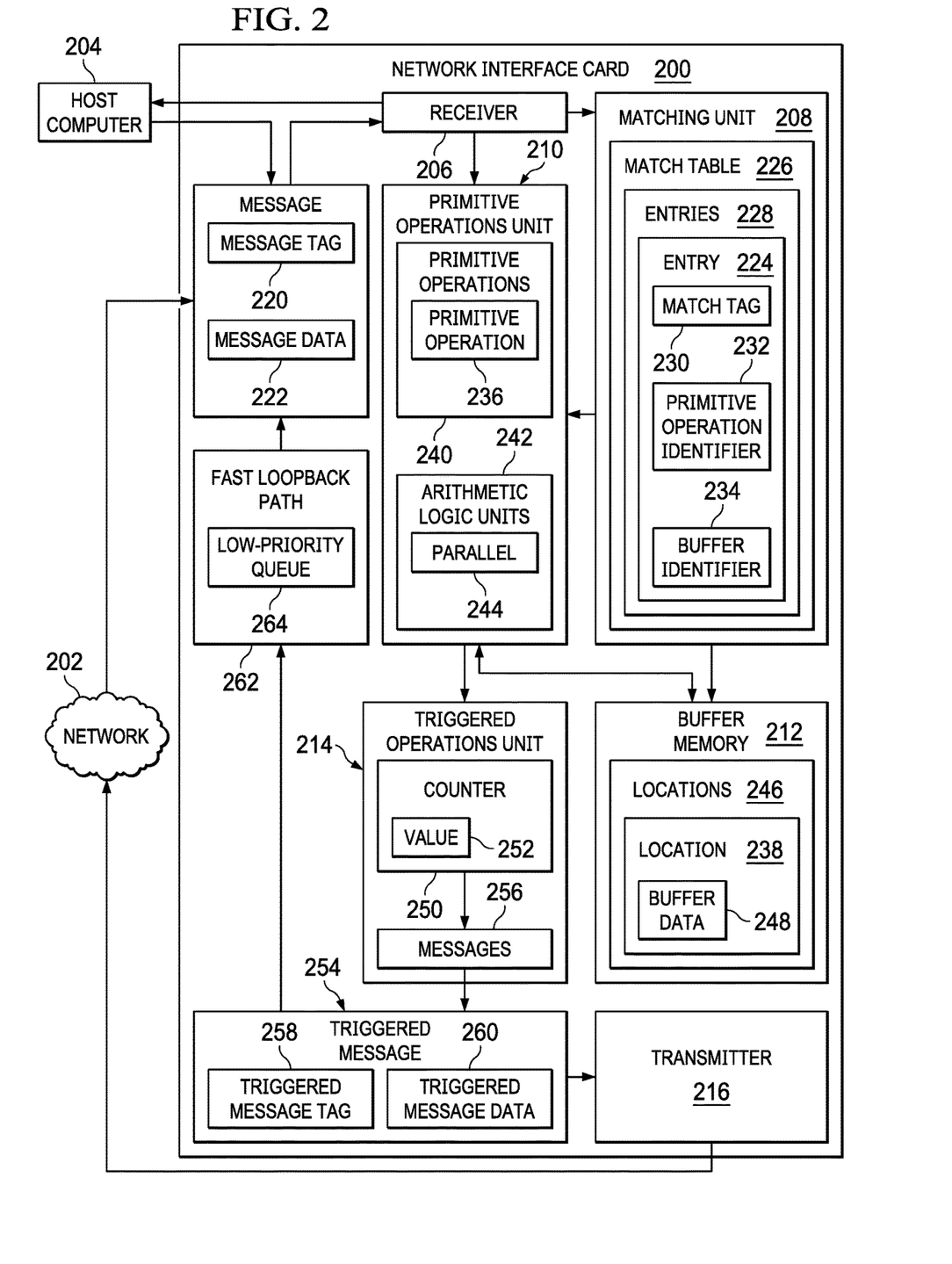
FIG. 2 is an illustration of a block diagram of a network interface card for providing compute assistance in accordance with an illustrative embodiment.

Turning to FIG. 2, an illustration of a block diagram of a network interface card for providing compute assistance is depicted in accordance with an illustrative embodiment. Network interface card 200 is an example of one implementation of network interface cards 112, 114, 116, and 118 in network data processing system 100 in FIG. 1. Network interface card 200 provides a connection to network 202 for host computer 204. Network 202 is an example of one implementation of network 102 in network data processing system 100 in FIG. 1. Host computer 204 is an example of one implementation of computer 104 in network data processing system 100 in FIG. 1.

Network interface card 200 includes receiver 206, matching unit 208, primitive operations unit 210, buffer memory 212, triggered operations unit 214, and transmitter 216. Receiver 206 is configured to receive message 218. Receiver 206 may be configured to receive message 218 from host computer 204, from network interface card 200 itself, or from another computer or network interface card via network 202. For example, without limitation, message 218 may be received from host computer 204 to initiate performing an operation in accordance with an illustrative embodiment.

Message 218 may include message tag 220. Message tag 220 may include any appropriate identifying information. Message 218 also may include message data 222. Message data 222 may include numerical data or any other appropriate data to be used in performing an operation in accordance with an illustrative embodiment.

Matching unit 208 is configured to interpret message 218 to identify primitive operation 236 to be performed. For example, without limitation, matching unit 208 may be configured to use message tag 220 from message 218 to identify a matching entry 224 in match table 226. For example, match table 226 may include plurality of entries 228. Each entry 224 in plurality of entries 228 may include an identifying match tag 230. Matching unit 208 may be configured to identify entry 224 in match table 226 having match tag 230 that matches message tag 220 in message 218.

Entry 224 in match table 226 may include primitive operation identifier 232. Primitive operation identifier 232 identifies primitive operation 236 to be performed by primitive operations unit 210 in any appropriate manner.

Entry 224 in match table 226 also may include buffer identifier 234. Buffer identifier 234 identifies location 238 in buffer memory 212 that may be used in performing primitive operation 236 in any appropriate manner.

Primitive operations unit 210 is configured to perform a plurality of primitive operations 240. Primitive operations unit 210 may be implemented in any appropriate manner to perform any appropriate primitive operations 240. For example, without limitation, primitive operations unit 210 may be implemented to perform primitive operations 240 using a plurality of arithmetic logic units 242 configured to operate in parallel 244.

Buffer memory 212 may comprise plurality of addressable memory locations 246. Each location 238 in plurality of locations 246 may store buffer data 248. Buffer data 248 may comprise numerical data or any other appropriate type of data.

In accordance with an illustrative embodiment, in response to receiving message 218, matching unit 208 identifies entry 224 in match table 226 having match tag 230 that matches message tag 220 in message 218. Primitive operations unit 210 then performs primitive operation 236 identified by primitive operation identifier 232 in the matching entry 224. Primitive operation 236 may use one or more of location 238 in buffer memory 212 identified by buffer identifier 234 in entry 224, buffer data 248 in location 238, and message data 222 from message 218. For example, without limitation, the result of primitive operation 236 may be stored at location 238 in buffer memory 212.

Triggered operations unit 214 is configured to identify triggered message 254 in response the performing of primitive operation 236. For example, without limitation, triggered operations unit 214 may include counter 250. In response to performing primitive operation 236, value 252 of counter 250 is changed. For example, without limitation, value 252 of counter 250 may be incremented in response to performing primitive operation 236 by primitive operations unit 210.

The change in value 252 of counter 250 is a trigger signal that triggers the identification and transmission of triggered message 254. For example, without limitation, value 252 of counter 250 may be used to identify triggered message 254 from plurality of messages 256.

Triggered message 254 may include triggered message tag 258. Triggered message tag 258 will be used, in the manner of message tag 220 in message 218, to identify the next primitive operation 236 to be performed.

Triggered message 254 also may include triggered message data 260. Triggered message data 260 may comprise numerical data or any other appropriate data for performing the next primitive operation.

Transmitter 216 is configured to transmit triggered message 254 back to network interface card 200 for processing as message 218, to another network interface card or computer via network 202, or to host computer 204. For example, without limitation, triggered message 254 may be transmitted to host computer 204 to indicate to host computer 204 that an operation is completed. Host computer 204 may then read the result of the operation from buffer memory 212. Transmitting triggered message 254 may include indicating completion of an operation or set of operations in any appropriate manner. For example, without limitation, transmitting triggered message 254 may include transmitting a network message or transmitting a signal using dedicated hardware interrupt, queue or other methods including software to either local or remote computers.

Transmitter 216 may transmit triggered message 254 back to network interface card 200 in the same manner as transmitting a message on network 202, via the network switch. Alternatively, fast loopback path 262 may be provided for triggered messages 254 directed back to network interface card 200. Fast loopback path 262 eliminates the trip through the network switch for triggered messages directed back to network interface card 200.

Optionally, fast loopback path 262 may include low-priority queue 264. Low-priority queue 264 provides buffering for triggered messages so that incoming data transmissions through network interface card 200 may take precedence over executing other operations on network interface card 200.

The illustration of network interface card 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
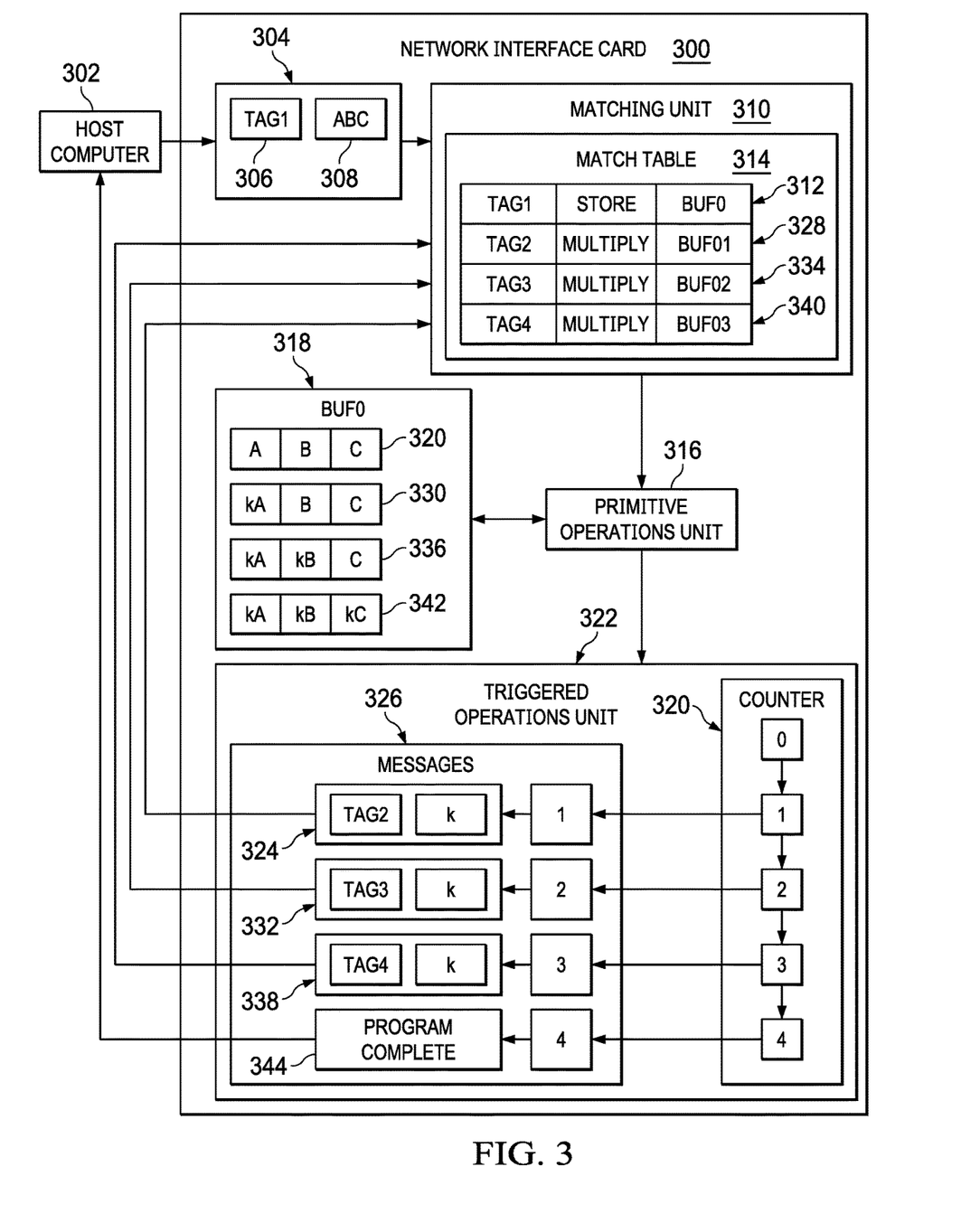
FIG. 3 is an illustration of an example of an operation performed by a network interface card in accordance with an illustrative embodiment.

Turning to FIG. 3, an illustration of an example of an operation performed by a network interface card is depicted in accordance with an illustrative embodiment. In this example, an operation of scaling a three-element input vector by a constant multiplier k is performed by network interface card 300. Network interface card 200 in FIG. 2 is an example of one implementation of network interface card 300.

Message 304 initiating the operation is received from host computer 302. Message 304 includes message tag TAG1 306 and message data comprising the initial three-value vector ABC 308.

Matching unit 310 identifies entry 312 in match table 314 having a match tag that matches message tag 308 of message 304. Entry 312 indicates that the primitive operation to be performed is STORE and the location in buffer memory to be used is BUF0.

Primitive operations unit 316 performs the STORE primitive operation to store the initial three-value vector provided in message data 308 in location BUF0 318 in buffer memory. Buffer data stored at buffer location BUF0 318 after performing the STORE primitive operation is shown at 320.

In response to performing the primitive operation, the value of counter 320 in triggered operations unit 322 is incremented from 0 to 1. Triggered message 324 corresponding to the value of counter 320 is identified in messages 326 and transmitted back into network interface card 300. Triggered message 324 includes message tag TAG2 and message data comprising the value k.

Matching unit 310 identifies entry 328 in match table 314 having a match tag that matches the message tag of triggered message 324. Entry 328 indicates that the next primitive operation to be performed is MULTIPLY and the location in buffer memory to be used is BUF01, the location of the first element in BUF0 318.

Primitive operations unit 316 performs the MULTIPLY primitive operation to multiply the value at location BUF01 by the value k provided in the message data in triggered message 324. Buffer data stored at buffer location BUF0 318 after performing the MULTIPLY primitive operation is shown at 330.

In response to performing the primitive operation, the value of counter 320 in triggered operations unit 322 is incremented from 1 to 2. Triggered message 332 corresponding to the value of counter 320 is identified in messages 326 and transmitted back into network interface card 300. Triggered message 332 includes message tag TAG3 and message data comprising the value k.

Matching unit 310 identifies entry 334 in match table 314 having a match tag that matches the message tag of triggered message 332. Entry 334 indicates that the next primitive operation to be performed is MULTIPLY and the location in buffer memory to be used is BUF02, the location of the second element in BUF0 318.

Primitive operations unit 316 performs the MULTIPLY primitive operation to multiply the value at location BUF02 by the value k provided in the message data in triggered message 332. Buffer data stored at buffer location BUF0 318 after performing the MULTIPLY primitive operation is shown at 336.

In response to performing the primitive operation, the value of counter 320 in triggered operations unit 322 is incremented from 2 to 3. Triggered message 338 corresponding to the value of counter 320 is identified in messages 326 and transmitted back into network interface card 300. Triggered message 338 includes message tag TAG4 and message data comprising the value k.

Matching unit 310 identifies entry 340 in match table 314 having a match tag that matches the message tag of triggered message 338. Entry 340 indicates that the next primitive operation to be performed is MULTIPLY and the location in buffer memory to be used is BUF03, the location of the third element in BUF0 318.

Primitive operations unit 316 performs the MULTIPLY primitive operation to multiply the value at location BUF03 by the value k provided in the message data in triggered message 338. Buffer data stored at buffer location BUF0 318 after performing the MULTIPLY primitive operation is shown at 342.

In response to performing the primitive operation, the value of counter 320 in triggered operations unit 322 is incremented from 3 to 4. Triggered message 344 corresponding to the value of counter 320 is identified in messages 326. Triggered message 344 indicates that the operation is complete and is transmitted back to host computer 302 to indicate that the buffer data in BUFO 318 is ready to be used.

Figure 4:
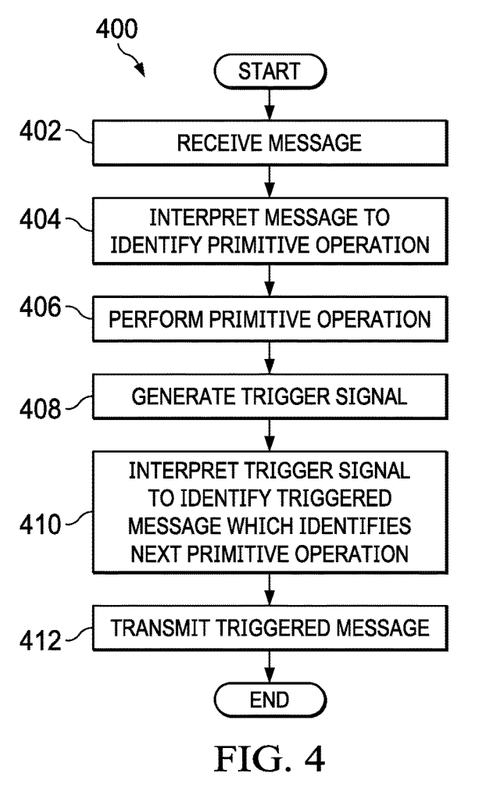
FIG. 4 is an illustration of a flowchart of a process for performing an operation in accordance with an illustrative embodiment.

Turning to FIG. 4, an illustration of a flowchart of a process for performing an operation is depicted in accordance with an illustrative embodiment. Process 400 may be implemented, for example, in network interface card 200 in FIG. 2. Process 400 may be repeated to perform each of a plurality of primitive operations to perform an operation.

Process 400 begins with receiving a message (step 402). The message may be received from a host processor to initiate performing an operation by performing a first primitive operation. Alternatively, the message may be a triggered message that was transmitted in response to performing a primitive operation.

The message is interpreted to identify a primitive operation to be performed (step 404). The primitive operation is performed (step 406). A trigger signal is generated in response to performing the primitive operation (step 408). The trigger signal is interpreted to identify a triggered message that identifies the next primitive operation to be performed (step 410). The triggered message is then transmitted for processing (operation 412), with the process terminating thereafter. Alternatively, step 410 may include identifying a triggered message that indicates that an operation is completed. In this case, step 412 may include transmitting the triggered message to a host computer.

Figure 5:
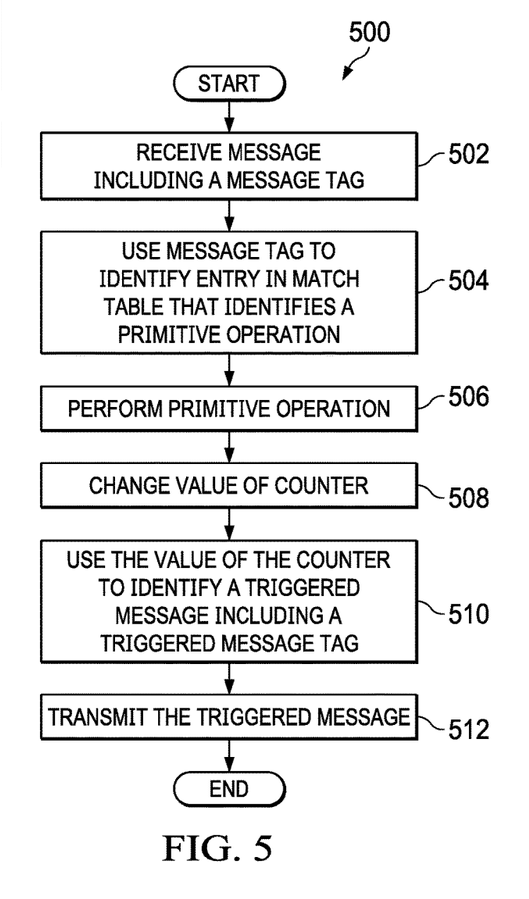
FIG. 5 is an illustration of a flowchart of a process for performing an operation in accordance with another illustrative embodiment.

Turning to FIG. 5, an illustration of a flowchart of a process for performing an operation is depicted in accordance with another illustrative embodiment. Process 500 is an example of one implementation of process 400 in FIG. 4. Process 500 may be implemented, for example, in network interface card 200 in FIG. 2. Process 500 may be repeated to perform each of a plurality of primitive operations to perform an operation.

Process 500 begins with receiving a message comprising a message tag (step 502). The message may be received from a host processor to initiate performing an operation by performing a first primitive operation. Alternatively, the message may be a triggered message that was transmitted in response to performing a primitive operation.

The message tag is used to identify an entry in a match table that identifies a primitive operation to be performed (step 504). The primitive operation is performed (step 506). In response to performing the primitive operation, a value of a counter is changed (step 508). The value of the counter is used to identify a triggered message including a triggered message tag that identifies the next primitive operation to be performed (step 510). The triggered message is then transmitted for processing (step 512), with the process terminating thereafter. Alternatively, step 510 may include identifying a triggered message that indicates that an operation is completed. In this case, step 512 may include transmitting the triggered message to a host computer.

Figure 6:
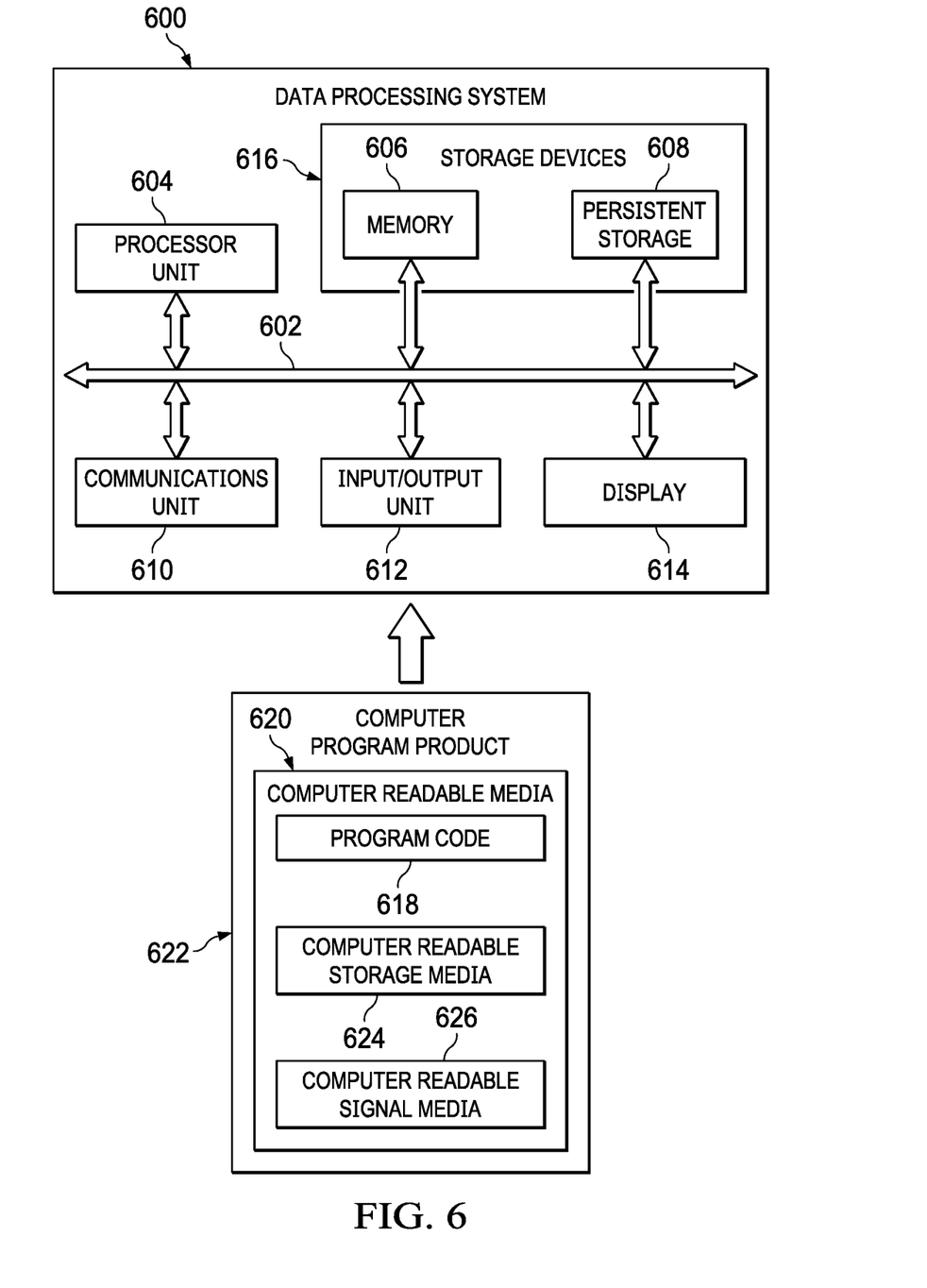
FIG. 6 is an illustration of a block diagram of a data processing system in accordance with an illustrative embodiment.

Turning to FIG. 6, an illustration of a block diagram of a data processing system is depicted in accordance with an illustrative embodiment. Data processing system 600 is an example of one possible implementation of computer 104 in FIG. 1 or host computer 204 in FIG. 2.

In this illustrative example, data processing system 600 includes communications fabric 602. Communications fabric 602 provides communications between processor unit 604, memory 606, persistent storage 608, communications unit 610, input/output (I/O) unit 612, and display 614. Memory 606, persistent storage 608, communications unit 610, input/output (I/O) unit 612, and display 614 are examples of resources accessible by processor unit 604 via communications fabric 602.

Processor unit 604 serves to run instructions for software that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and other suitable information either on a temporary basis or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, network interface cards 112, 114, 116, and 118 in FIG. 1, and network interface card 200 in FIG. 2 are examples of communications unit 610. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program instructions, program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code. As one example, data processing system 600 may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system.

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in communications fabric 602.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of performing an operation by a network interface card for a host computer that connects the host computer to a network, the method comprising:
   receiving a message;
   interpreting the message to identify a primitive operation to be performed, wherein the primitive operation is one of a plurality of primitive operations that are performed to perform the operation;
   performing the primitive operation;
   generating a trigger signal in response to performing the primitive operation;
   interpreting the trigger signal to identify a triggered message, wherein the triggered message identifies a next one of the plurality of primitive operations to be performed;
   transmitting the triggered message back to the network interface card for the host computer or to another network interface card for another computer on the network, and further comprising:
   receiving the triggered message by the network interface card or the other network interface card;
   interpreting the triggered message, by the network interface card or the other network interface card, to identify another primitive operation to be performed, wherein the other primitive operation is another one of the plurality of primitive operations that are performed to perform the operation;
   performing the other primitive operation by the network interface card or the other network interface card;
   generating another trigger signal, by the network interface card or the other network interface card, in response to performing the other primitive operation;
   interpreting the other trigger signal, by the network interface card or the other network interface card, to identify another triggered message, wherein the other triggered message identifies a further next one of the plurality of primitive operations to be performed; and
   transmitting the other triggered message by the network interface card or the other network interface card.

2. The method of claim 1 further comprising repeating the steps of receiving a message, interpreting the message, performing a primitive operation, generating a trigger signal, interpreting the trigger signal, and transmitting a triggered message using a last triggered message until the operation is completed.

3. The method of claim 1, wherein receiving the message is selected from:
   receiving the message from the host computer;
   receiving another triggered message from the network interface card for the host computer; or
   receiving another triggered message from another network interface card for another computer on the network.

4. The method of claim 1, wherein:
   the message comprises a message tag;
   interpreting the message comprises identifying an entry in a match table using the message tag, wherein the entry in the match table identifies the primitive operation to be performed;
   generating the trigger signal comprises changing a value of a counter; and
   interpreting the trigger signal comprises identifying the triggered message using the value of the counter.

5. The method of claim 1, wherein the network comprises at least one of:
   the Internet;
   an intranet;
   a local area network;
   a metropolitan area network; or
   a wide area network.

6. The method of claim 1, wherein:
   the entry in the match table identifies a location in a buffer memory; and
   performing the primitive operation changes buffer data stored at the location in the buffer memory.

7. The method of claim 1, wherein transmitting the triggered message back to the network interface card comprises transmitting the triggered message via a fast path loopback comprising a low-priority queue.

8. A method of performing an operation by a network interface card for a host computer that connects the host computer to a network, the method comprising:
   receiving a message comprising a message tag;
   using the message tag to identify an entry in a match table, wherein the entry in the match table identifies a primitive operation to be performed, wherein the primitive operation is one of a plurality of primitive operations that are performed to perform the operation;
   performing the primitive operation;
   changing a value of a counter in response to performing the primitive operation;
   using the value of the counter to identify a triggered message, wherein the triggered message comprises a triggered message tag identifying a next one of the plurality of primitive operations to be performed;
   transmitting the triggered message back to the network interface card for the host computer, and further comprising:
   receiving the triggered message by the network interface card;
   using the triggered message tag to identify another entry in the match table, wherein the other entry in the match table identifies another primitive operation to be performed, wherein the other primitive operation is another one of the plurality of primitive operations that are performed to perform the operation;
   performing the other primitive operation by the network interface card;
   changing the value of the counter in response to performing the other primitive operation;
   using the value of the counter to identify another triggered message, wherein the other triggered message comprises another triggered message tag identifying a next one of the plurality of primitive operations to be performed; and
   transmitting the other triggered message.

9. The method of claim 8, wherein:
the entry in the match table identifies a location in a buffer memory; and
performing the primitive operation changes buffer data stored at the location in the buffer memory.

10. The method of claim 9, wherein:
the message comprises message data; and
performing the primitive operation comprises changing the buffer data using the message data.

11. The method of claim 8, wherein changing the value of the counter comprises incrementing the value of the counter in response to performing the primitive operation.

12. The method of claim 8, wherein the triggered message further comprises triggered message data.

13. The method of claim 8, wherein receiving the message is selected from:
receiving the message from the host computer;
receiving another triggered message from the network interface card for the host computer; or
receiving another triggered message from another network interface card for another computer on the network.

14. The method of claim 8, wherein the network comprises at least one of:
the Internet;
an intranet;
a local area network;
a metropolitan area network; or
a wide area network.

15. The method of claim 8, wherein transmitting the triggered message back to the network interface card comprises transmitting the triggered message via a fast path loopback comprising a low-priority queue.

* * * * *